United States Patent
Lefebvre et al.

(10) Patent No.: US 11,905,424 B2
(45) Date of Patent: Feb. 20, 2024

(54) FABRICATION OF CHROMIUM METAL MIXTURES IN THE FORM OF CORE-SHELL NANOPARTICLES

(71) Applicant: General Electric Company, Schenectady, NY (US)

(72) Inventors: Louis Lefebvre, Valcourt (CA); Ehsan Marzbanrad, Waterloo (CA); Ehsan Toyserkani, Waterloo (CA); Boxin Zhao, Waterloo (CA); Jeremy Vandenberg, Brinston (CA)

(73) Assignee: General Electric Company, Schenectady, NY (US)

( * ) Notice: Subject to any disclaimer, the term of this patent is extended or adjusted under 35 U.S.C. 154(b) by 711 days.

(21) Appl. No.: 16/372,018

(22) Filed: Apr. 1, 2019

(65) Prior Publication Data
US 2020/0306835 A1    Oct. 1, 2020

(51) Int. Cl.
*C09D 11/322* (2014.01)
*B22F 9/24* (2006.01)
*C09D 11/52* (2014.01)
*B22F 1/17* (2022.01)
*B22F 1/054* (2022.01)
(Continued)

(52) U.S. Cl.
CPC ............ *C09D 11/322* (2013.01); *B22F 1/054* (2022.01); *B22F 1/056* (2022.01); *B22F 1/0545* (2022.01); *B22F 1/17* (2022.01); *B22F 9/24* (2013.01); *C09D 11/52* (2013.01); *B22F 2301/20* (2013.01); *B22F 2301/25* (2013.01); *B22F 2304/054* (2013.01); *B22F 2304/056* (2013.01);
(Continued)

(58) Field of Classification Search
CPC ........................................................ B22F 9/24
See application file for complete search history.

(56) References Cited

U.S. PATENT DOCUMENTS 3,440,062 A * 4/1969 Hoffman ................ C03C 3/122
                                                          106/1.13
6,221,140 B1   4/2001 Kobayashi et al.
(Continued)

FOREIGN PATENT DOCUMENTS

CN       101024246 A       8/2007
CN       103128308         6/2013
(Continued)

OTHER PUBLICATIONS

The State Intellectual Property Office of People's Republic of China, "First Office Action," issued in connection with CN Application No. 202010243508.X, dated Aug. 10, 2022, 16 pages. [English Translation Included].
(Continued)

*Primary Examiner* — William D Young
(74) *Attorney, Agent, or Firm* — Hanley, Flight & Zimmerman, LLC

(57) ABSTRACT

Core-shell microparticles, along with methods of their fabrication and use, are provided. The core-shell microparticles may include a core comprising a first metallic material having a first chromium content and a shell surrounding the core and comprising a second metallic material having a second chromium content that is less than the first chromium content. For example, the first chromium content may be 5% by weight or greater of elemental chromium within the first metallic material.

19 Claims, 4 Drawing Sheets

(51) Int. Cl.
    *B22F 1/0545*     (2022.01)
    *B82Y 40/00*     (2011.01)
    *B82Y 30/00*     (2011.01)

(52) U.S. Cl.
    CPC .......... *B22F 2998/00* (2013.01); *B82Y 30/00* (2013.01); *B82Y 40/00* (2013.01)

(56) References Cited

U.S. PATENT DOCUMENTS

| | | | |
|---|---|---|---|
| 6,465,132 B1* | 10/2002 | Jin | H01J 1/3044 977/762 |
| 7,575,621 B2 | 8/2009 | Vanheusden et al. | |
| 7,589,241 B1* | 9/2009 | Lebedev | C07C 68/06 568/875 |
| 7,625,637 B2 | 12/2009 | Kim | |
| 7,749,300 B2* | 7/2010 | Chretien | B82Y 30/00 75/371 |
| 7,906,632 B2 | 3/2011 | Nusser | |
| 9,449,734 B2 | 9/2016 | Seong et al. | |
| 2003/0039860 A1* | 2/2003 | Cheon | B01J 13/02 428/843.4 |
| 2007/0212562 A1 | 9/2007 | Shim | |
| 2009/0301344 A1 | 12/2009 | Chretien et al. | |
| 2010/0233361 A1* | 9/2010 | Hu | C09D 11/52 252/514 |
| 2015/0372312 A1 | 12/2015 | Atwan | |
| 2017/0028626 A1* | 2/2017 | Delrot | A61F 9/0026 |
| 2017/0226362 A1 | 8/2017 | Fratello et al. | |
| 2018/0311892 A1 | 11/2018 | Abbott, Jr. et al. | |
| 2019/0015896 A1 | 1/2019 | Reed | |

FOREIGN PATENT DOCUMENTS

| | | |
|---|---|---|
| CN | 105322187 A | 2/2016 |
| CN | 108941543 A | 12/2018 |
| CN | 109175396 A | 1/2019 |

OTHER PUBLICATIONS

The State Intellectual Property Office of People's Republic of China, "First Search," issued in connection with Chinese Patent Application No. 202010243508.X, dated Aug. 3, 2022, 2 Pages.

\* cited by examiner

FABRICATION OF CHROMIUM METAL MIXTURES IN THE FORM OF CORE-SHELL NANOPARTICLES

FIELD

The present disclosure generally relates to fabrication methods for the formation of chromium metal mixtures in the form of core-shell nanoparticles.

BACKGROUND

Direct-Ink-Writing (DIW), sometimes referred to as robocasting, is an additive manufacturing technique in which a filament of a paste or mist of liquid (referred to as an "ink" per the analogy with conventional printing techniques) is extruded or injected from a small nozzle while the nozzle is moved across a platform. This technology usually falls under "material extrusion" or "material jetting" classes of additive manufacturing. The object is thus built by "writing" the required shape layer by layer. In DIW, a 3D computer-aided design (CAD) model is divided up into layers in a similar manner to other additive manufacturing techniques. The ink (typically a ceramic or liquid) is then extruded or injected through a small nozzle as the nozzle's position is controlled, drawing out the shape of each layer of the CAD model. The ink exits the nozzle in a liquid-like state but retains its shape immediately, exploiting the rheological property of shear thinning. It is distinct from fused deposition modelling as it does not rely on the solidification or drying to retain its shape after extrusion.

Aerosol-based direct-write refers to the additive process of printing features of a component from a CAD model using an apparatus which creates a liquid or solid aerosol beam from an aerosol ink. Direct-write technologies are particularly useful in the microelectronics industry for forming components such as interconnects, sensors, and thin film transistors (TFTs), with new applications for aerosol direct-write being rapidly conceived.

However, aerosol-based direct-write capabilities hinge on the types of consumable metallization inks that are available. The ink compositions for aerosol-based direct-write are tailored for specific rheological, surface, and mass transfer properties. Improved ink compositions are welcome in the art, particularly for certain reactive metals (such as chromium-containing nanoparticles that are significantly more susceptible to poisons than conventional silver or gold inks) that lead to inks having a prohibitively short shelf life and/or the tendency to agglomerate and poorly atomize.

Chromium metal nanoparticle mixtures, where the chromium exists in a reduced state, are not available in the current market due to the technical difficulty involved with their formation without aggregating, oxidizing, or destabilizing the particles. In particular, chromium metal has a highly surface reactive, and the chromium nanoparticles exhibit a high surface to volume ratio.

As such, a need exists for improved methods of forming chromium nanoparticles, particularly nanoparticles containing chromium and other metals, such as for use within aerosol-based direct-write inks.

BRIEF DESCRIPTION

Aspects and advantages will be set forth in part in the following description, or may be obvious from the description, or may be learned through practice of the invention.

Core-shell microparticles are generally provided, along with methods of their fabrication and use. In one embodiment, the core-shell microparticles include a core comprising a first metallic material having a first chromium content and a shell surrounding the core and comprising a second metallic material having a second chromium content that is less than the first chromium content. For example, the first chromium content may be 5% by weight or greater of elemental chromium within the first metallic material (e.g., the first metallic material comprises 50% by weight or greater of elemental chromium, such as consisting essentially of elemental chromium).

In particular embodiments, the second metallic material comprises palladium, copper, nickel, platinum, gold, silver, iron, titanium, or a mixture thereof. For instance, the second metallic material comprises 50% by weight or greater of palladium.

An aerosol ink is also generally provided that includes such core-shell microparticles dispersed in a solvent system. For instance, the solvent system may include a mixture of a first solvent and a second solvent with the second solvent has a vapor pressure that is lower than the first solvent.

Methods are also generally provided of forming a plurality of core-shell nanoparticles from a dispersion containing a plurality of chromium nanoparticles in an acidic solution. In one embodiment, the method comprising: adding a reducing agent to the dispersion including the plurality of chromium nanoparticles; dispersing the plurality of chromium nanoparticles within the acidic solution; and adding a metallic acetate chelate to the dispersion such that the metallic acetate chelate comprises a metallic material that surrounds the chromium nanoparticles to form the plurality of core-shell nanoparticles; and removing the acidic solution from the dispersion. The chromium nanoparticles have a first chromium content, and the metallic material has a second chromium content that is less than the first chromium content.

These and other features, aspects and advantages will become better understood with reference to the following description and appended claims. The accompanying drawings, which are incorporated in and constitute a part of this specification, illustrate embodiments of the invention and, together with the description, serve to explain certain principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended Figs., in which.

Figure 1:
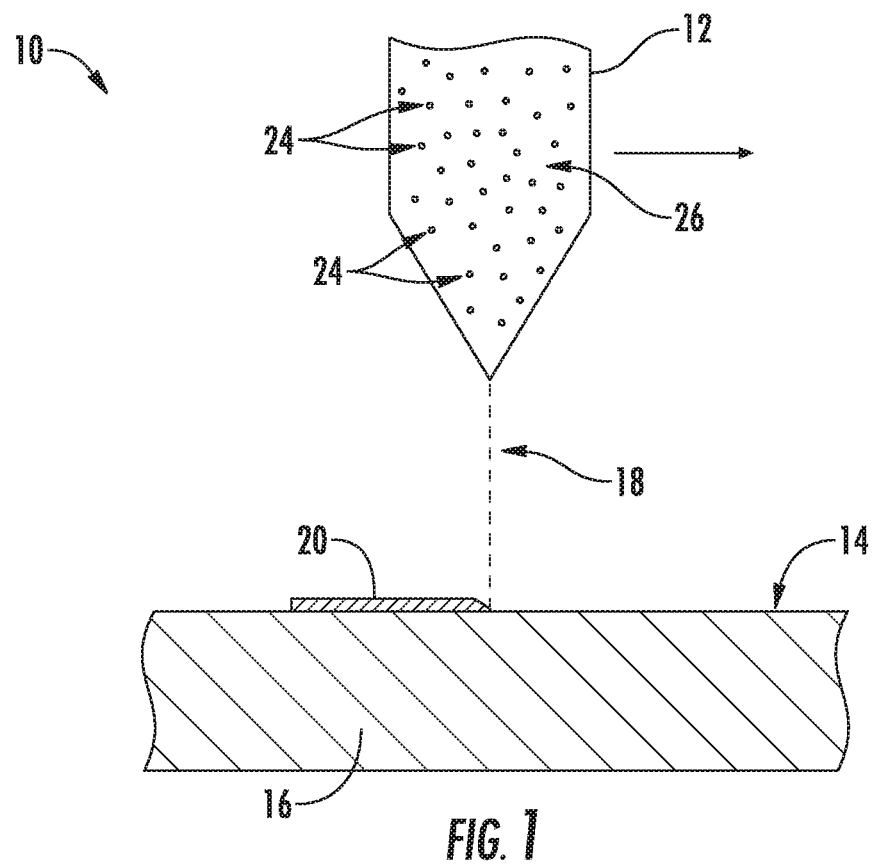
FIG. 1 shows a diagram of a direct write nozzle applying an aerosol ink to form a chromium-containing metal layer onto a surface of a component.
Figure 2:
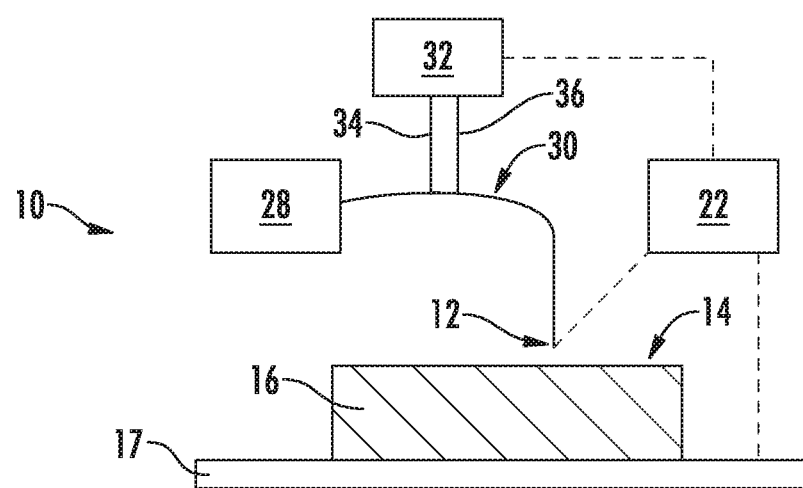
FIG. 2 shows a diagram of a direct write system including a supply of aerosol ink, a motion system controller, a heated substrate, a nozzle, and its gas flow and temperature controller.

Repeat use of reference characters in the present specification and drawings is intended to represent the same or analogous features or elements of the present invention.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the terms "first", "second", and "third" may be used interchangeably to distinguish one feature from another and are not intended to signify importance of the individual components.

Chemical elements are discussed in the present disclosure using their common chemical abbreviation, such as commonly found on a periodic table of elements. For example, hydrogen is represented by its common chemical abbreviation H; helium is represented by its common chemical abbreviation He; and so forth.

As used herein, the prefix "micro" refers to the micrometer scale up to about 1 micrometer (μm). For example, particles having an average diameter on the micrometer scale (e.g., less than 1 μm) are referred to as "microparticles." As used herein, the prefix "nano" refers to the nanometer scale up to about 100 nm. For example, particles having an average diameter on the nanometer scale (e.g., from about 0.1 nm to about 100 nm) are referred to as "nanoparticles."

As used herein, the term "substantially free" means no more than an insignificant trace amount may be present that does not alter any characteristic of the composition. The term "substantially free" also encompasses completely free.

As used here, the term "chromium-containing" refers to a material (e.g., particle, ink, etc.) that includes chromium in its elemental, metal state. This elemental chromium may also be referred to as being in its reduced state, which is distinct from chromium's cationic state such as found in chromium oxides, chromium nitrides, etc.

Methods are generally provided for the fabrication of microparticles that include elemental chromium coated with another metallic material, along with the resulting core-shell microparticles and inks containing such microparticles. That is, the core-shell microparticles include a core that contains elemental chromium and a shell that contains a metallic material that is less reactive than elemental chromium. For example, the shell may include a metallic material (e.g., a metal or a metal alloy) that has a chromium content that is less than the chromium content of the core.

The shell layer provides a barrier for chromium poison interaction. In particular embodiments, the shell layer facilitates sintering of the particles as the surface energy barrier to initiate sintering is lower. Such core-shell metal nanoparticle mixtures are more resistant to poisons and contaminants in subsequent processing steps, when compared to nanoparticles having chromium exposed on the nanoparticle surface. The development of such core-shell nanoparticles allows for the advancement of Direct Write materials for moderate temperatures (e.g., about 1550° C.), and would also benefit the formation of other reactive nanoparticle formulations such as copper, nickel, iron, aluminum, titanium, iridium, and tungsten nanoparticles.

Figure 6:
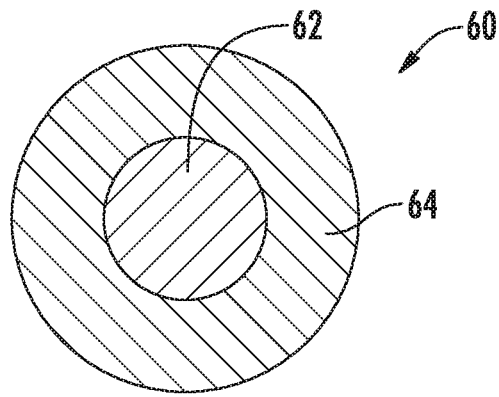
FIG. 6 shows an exemplary core-shell nanoparticle according to certain embodiments herein.

Referring to FIG. 6, a cross-section of an exemplary core-shell nanoparticle 60 is generally shown. The core-shell nanoparticle 60 includes a core 62 comprising a first metallic material having a first chromium content. For instance, the core may include 5% by weight or greater of chromium. In certain embodiments, the core 62 may be primarily chromium, such as the first chromium content may include chromium that is greater than 50% by weight, such as 75% or greater by weight. In particular embodiments, the core 62 may have a first chromium content that includes chromium in an amount that is greater than 90% by weight, such as greater than 95% by weight. In one particular embodiment, the core 62 may consist essentially of chromium (i.e., pure chromium with only incidental impurities therein). That is, the chromium core 62 may be substantially free from other metal elements (i.e., the core consists of chromium). In other embodiments, a relatively small amount of an alloying element may be included within the chromium core, such as up to 10%. For example, suitable alloying elements may include copper, nickel, platinum, gold, silver, iron, titanium, iridium, cobalt, rhodium, tungsten, or mixtures thereof.

The core-shell nanoparticle 60 also includes a shell 64 surrounding the core 62 and comprising a second metallic material having a second chromium content that is less than the first chromium content. For example, the second chromium content of the shell 64 may include chromium that is 25% or less by weight, such as 10% or less by weight. In particular embodiments, the shell 64 may have a second chromium content that is substantially free from chromium. The second metallic material of the shell 64 may include, for example, palladium, copper, nickel, platinum, gold, silver, iron, titanium, or a mixture thereof, such as 75% or more by weight of palladium, copper, nickel, platinum, gold, silver, iron, titanium, or a mixture thereof. In one particular embodiment, the second metallic material of the shell 64 may include 75% or more of palladium, such as 90% or more of palladium. In one embodiment, the second metallic material of the shell 64 may consist essentially of palladium.

The core-shell nanoparticles 60 may be formed from a dispersion containing a plurality of chromium nanoparticles in an acidic solution. The chromium nanoparticles generally have the first chromium content and result in the core 62 of the core-shell nanoparticles 60. In one embodiment, the acidic solution may include acetic acid. In one embodiment, the acidic solution may be glacial acetic acid (i.e., acetic acid that contains less than 1% by volume). Generally, glacial acetic acid may be particularly suitable because of its low water content, and its ability to minimize potential damage to personnel and equipment. Acetic acid also serves as a solvent for the acetate salts described below, when utilized with such salts. However, other organic acids may be used in the acidic solution, including but not limited to, formic acid, propionic acid, butyric acid, valeric acid, caproic acid, enathic acid, caprylic acid, pelargonic acid, other liquid fatty acids, or mixtures thereof.

A reducing agent may be added to the dispersion that includes the plurality of chromium nanoparticles dispersed within the acidic solution. The reducing agent may serve as an oxygen scavenger and/or a reducing agent to the chromium within the chromium nanoparticles. For example, the reducing agent may include hydrazine hydrate. Hydrazine hydrate is particularly suitable because it cleanly decomposes into nitrogen gas and water, and it also reduces the metal salts at an appropriate rate. Other reducing agents may be utilized, including but not limited to diphosphorous hydride, n-butyl lithium, t-butyl lithium, sodium borohydride, sodium formaldehyde sulfoxylate, or mixtures thereof.

In particular embodiments, the plurality of chromium nanoparticles may be ultrasonically dispersed within the acidic solution, before and/or after adding a reducing agent to the dispersion. By dispersing the plurality of chromium nanoparticles, agglomerations of these nanoparticles can be minimized to assure more homogenous dispersion of the nanoparticles within the dispersion such that each nanoparticle is accepting of a shell coating thereon.

A metallic acetate chelate may be added to the dispersion such that the metallic acetate chelate includes a metallic material that surrounds the chromium nanoparticles to form the plurality of core-shell nanoparticles 60. Generally, the metallic material forms the shell 64 of the core-shell nanoparticles 60 and has the second chromium content that is less than the first chromium content. For example, the metallic acetate chelate may be formed by mixing a metallic acetate (that includes the metallic material) with a chelating agent. In one particular embodiment, tetracarboxilic acid group chelates may be utilized, such as ethylenediaminetetracetic acid and its salts; succinic acid and its salts; the salts of fumaric acid, malonic acid, and glutaric acid; other bulky carboxylic acid molecules, or mixtures thereof.

In particular embodiments, the metallic acetate may include palladium acetate, copper acetate, nickel acetate, platinum acetate, gold acetate, silver acetate, iron acetate, titanium acetate, or a mixture thereof.

The acidic solution can then be removed (e.g., evaporated) from the dispersion to leave the core-shell nanoparticles. As such, the nanoparticles may be extracted from the dispersion solvent system. For example, the nanoparticles may be centrifuged out of the dispersion solvent system. The nanoparticles may be washed after extraction.

The nanoparticles formed according to these methods may be used in a variety of applications, including within an aerosol ink. In particular, the aerosol ink provided allows for the use of the Direct Write process for chromium containing alloys. In particular embodiments, the aerosol ink produces adequate processing properties such as aerosol density, aerosol uniformity, and/or consistent mass deposition rate for the use with Direct-Write processes. For example, the aerosol ink may have an appropriate shelf life for use with commercial Direct-Write applications.

In one embodiment, the aerosol ink includes a plurality the core-shell nanoparticles dispersed within a solvent system. As used herein, the term "nanoparticles" refers to particles having a maximum dimension of 100 nm. Generally, core-shell nanoparticles have different properties compared to their bulk counterparts. Core-shell nanoparticles have properties that may be dependent on the particle size. This small size, and increased surface energy, also provides a mechanism for chemical functionalization to occur on the surface of the metal particle. It is such a specific chemical surface modification that is a focus of embodiments of the present invention.

The shape of the core-shell nanoparticles may vary based on the desired printing application. For example, in certain embodiments, the core-shell nanoparticles may have a substantially spherical shape, as discussed above. In other embodiments, the core-shell nanoparticles may be flake-like shapes or other irregular shapes.

In particular embodiments, the core-shell nanoparticles may be purified before being utilized within the aerosol ink. Such a purification process may be configured to remove contaminants and other materials that may poison the resulting aerosol ink composition. For example, reactive materials may be removed from the core-shell nanoparticles. In one embodiment, the reactive species are dissolved gasses of oxygen and nitrogen, as well as excess nitrates and acetate salts (e.g., organic/inorganic salts) that decompose into oxygen or nitrogen. For instance, the solvents may be degassed under vacuum to remove these oxygen and nitrogen containing impurities and stored under an inert gas. Additionally, solvent exchanges may be performed to dilute the species, such as through precipitation of the solids, decantation, and redispersion of the solids in fresh solvent.

The core-shell nanoparticles may be loaded to a maximum solvable amount. For example, the plurality of core-shell nanoparticles may be present in a loading amount of 1% to 30% by weight of the total aerosol ink (e.g., 5% to 10% by weight).

The solvent system may generally have a viscosity suitable for its desired use, which may be 0.5 cP to 10,000 cP depending on the particular application. In an embodiment for Direct-Write inks, the viscosity may be relatively low, such as 0.5 cP to 30 cP (e.g., a viscosity of 0.5 cP to 10 cP). This relatively low viscosity allows for stabilization of the chromium-containing metallic nanoparticles against gravitational settling. For example, viscosity may start having a marked effect on the atomization process of the Direct-Write ink, and the ultrasonic chamber cannot use inks greater than 30 cP.

In one embodiment, the solvent system includes at least two solvents that are miscible with each other. For example, the solvent system may be a dual solvent system (i.e., including two miscible solvents: a first solvent and a second solvent). Although described as including a first solvent and a second solvent, it is to be understood that additional solvents may be included within the solvent system as desired.

The first solvent may be included within the solvent system to suspend the particles within the solvent system and to evaporate in a controlled manner upon printing of the ink. For example, the first solvent may have a higher vapor pressure than the second solvent in the solvent system such that the first solvent evaporates faster than the second solvent during printing. Particularly suitable first solvents that may be utilized within the solvent system include, but are not limited to, 1-methoxy-2-propanol, n-decane, n-hexane, n-heptane, n-octane, n-nonane, alpha-terpineol, cyclohexane, isopropanol, simple carbon chain alcohols (e.g., up to 15 carbons in chain) such as decanol, isobutyl alcohol, benzyl alcohol, and mixtures thereof.

For example, the solvent system may include a first solvent that is an alcohol-based solvent having at least one alcohol moiety to increase the solvating capacity of the solvent system to keep the chromium-containing metallic nanoparticles suspended therein. Additionally, the alcohol-based solvent may be configured to decrease the oxygen content within the aerosol ink to inhibit reaction (e.g., oxidation) with chromium within the chromium-containing metallic nanoparticles. In one particular embodiment, the alcohol-based solvent may include at least both a hydroxyl group (i.e., the alcohol moiety) and an ether moiety within the molecule, such as 1-methoxy-2-propanol.

The second solvent may be included within the solvent system to have a relatively low vapor pressure (i.e., the vapor pressure of the second solvent is lower than the vapor pressure of the first solvent) so that the second solvent remains in the ink for a longer period of time to inhibit the ink from drying too fast. As such, the second solvent may have an evaporation point that is higher than the evaporation point of the first solvent. Additionally, the second solvent may modify the Hansen solubility parameters (HSP). The Hansen Solubility Parameters track the hydrogen, polar, and dispersive forces of a solvent. Solvent mixtures reliably change their parameters according to the volume fraction in the mixture. By altering the parameters with a second solvent, these parameters may be fine-tuned according to the volume fraction, which determines the solubility. By adding a second solvent, the vector that the mixture makes can be brought closer to the vector of the molecular species that caps the microparticle to allow for better dispersion of the particles. For instance, where PVP is present in the ink, the second solvent may have HSP high dispersive and hydrogen parameters.

In particular embodiments, the second solvent may include, but are not limited to, α-terpineol, nerol, N-acetyl pyrrolidone, acetonecyanhydrin, acetic anhydride, acetanilide, acetamide, acrylic acid, ascorbic acid, biuret, o-chlorothiophenol, diethylene glycol, catechol, 4-ethyl phenol, ethylene chlorohydrin, ferulic acid, furfuryl alcohol, thiodiethylenglycol, or mixtures thereof.

In one embodiment, the second solvent may include another alcohol-based solvent (different than the first alcohol-based solvent) that has an evaporation point that is higher than the evaporation point of the first solvent so as to maintain shelf life of the aerosol ink. For instance, such another alcohol-based solvent may include α-terpineol.

In one particular embodiment, one of the solvents (e.g., the first solvent) has a surface tension that is higher than the other solvent (e.g., the second solvent). Through the use of multiple solvents, the ratio of the dimensionless number, Ohnesorge's number, may be controlled by selecting first and second solvents with the varying viscosities and surface tensions, as well as controlling their respective volumetric ratios within the solvent system. Ohnesorge's number relates the viscous forces to inertial and surface tension forces of the solvent system. Ohnesorge's number relates the viscous forces to inertial and surface tension forces of the solvent system. Ohnesorge's number is calculated by the formula: viscosity/(square root of (density*surface tension*droplet diameter). Accounting for a 5 μm droplet diameter, embodiments of Direct-Write inks, Ohnesorge's number of the ink may be 0.04 to 0.4 (e.g., 0.03 to 0.2, such as 0.048 to 0.18). In one embodiment, for example, the first solvent may be n-Decane (surface tensions of about 23 mN/m), and the second solvent may be Dowanol™ (surface tension of 70 mN/m), which is a glycol ether based solvent available commercially from The Dow Chemical Company.

When at least two solvents are present, such as described above, the first solvent and the second solvent may be present in a volumetric ratio of 4:1 to 12:1 (e.g., in a volumetric ratio of 7:1 to 10:1).

In certain embodiments, the core-shell nanoparticles may be loaded within the solvent system to a maximum solvable amount. For example, the core-shell nanoparticles may be present in a loading amount of 5% to 30% by weight of the total aerosol ink (e.g., in a loading amount of 5% to 10% by weight of the total aerosol ink).

At least one additive may also be present in the aerosol ink. The additives may be included to help extend the shelf life of the aerosol ink and increase the stability of the core-shell nanoparticles. For example, the aerosol ink may include at least one additive selected from a dispersant, a capping agent, a solvating agent, a solvent, an additive compatible with the chromium of the core-shell nanoparticles, a radical scavenger, or a combination thereof. That is, such additives may be compatible with the reactive chromium chemistry, and significantly differ than the common art used with more noble metal particles.

In one embodiment, for instance, the aerosol ink may include up to 5% by weight of a dispersant and/or a capping agent (e.g., 0.1% to 5% by weight). It is noted that certain additives may serve a dual purpose of acting as a dispersant and a capping agent. Dispersants may be included within the aerosol ink to inhibit conglomeration of the microparticles, such as polymer dispersants (e.g., polyvinylpyrrolidone, polyvinyl alcohol, etc.) and ammonium salts of simple acid-based compounds (e.g., ammonium ethylenetetraacetic acid), or mixtures thereof. Suitable capping agents may be included within the aerosol ink to inhibit chemical interaction and/or reaction between a solvent (e.g., an alcohol species of the solvents) and the microparticles, such as thio-based capping agent, polymer-based capping agents (e.g., polyvinylpyrrolidone, polyvinyl alcohol, long chain and/or bulky thiols such as n-decanethio, dodecane thiol, etc.), or mixtures thereof.

The aerosol ink may include, in certain embodiments, up to 5% by weight of a solvating agent(s). A solvating agent may be included within the aerosol ink to facilitate the interaction of solvent with the dispersed microparticles. In certain embodiments, the solvating agents may be interchangeable with the dispersants. However, solvating agents may be favored over dispersants if they are less bulky or sterically hindered than the dispersants. For instance, solvating agents may include, but are not limited to, acetic acid, ethylenediaminetetraacetic acid (EDTA), or mixtures thereof.

The aerosol ink may include, in certain embodiments, up to 1% by weight of a radical scavenger(s) to serve as a reducing agent. The radical scavenger may be present to interact with any radicals formed from the chromium-containing metallic microparticles during storage and/or printing processing (particularly those radicals formed during aerosolization of the ink). Suitable radical scavengers may include, but are not limited to, hydrazine, hindered amine light stabilizers (e.g., tetramethyl piperidine), ascorbic acid, hydroquinone and it's derivatives, catechols, organo phosphites, or mixtures thereof.

As stated, the aerosol inks may be utilized in a non-contact printing process to form chromium-containing metal layers and/or components. Examples of non-contact printing include, but are not limited to, direct write, inkjet, dispenser, and spray coatings. For example, the aerosol inks may be used to form specific patterns for electrical contacts on a component (e.g., a wafer). The non-contact printing techniques utilize finite nozzles that distribute the ink to the substrate surface.

Referring to FIG. 1 and FIG. 2, a schematic diagram of an exemplary direct write system 10 is shown having a nozzle 12 moveable over a surface 14 of a component 16. The nozzle size for a typical direct write print head is less than 300 μm, though the nozzle size may be adjusted for the particular printing application. The nozzle 12 is moved in a controlled manner over the surface 14 of the component 16 in accordance with instructions from a controller 22. The nozzle 12 applies the aerosol ink 18 onto the surface 14 to form a chromium-containing metal layer 20 thereon. As discussed in greater detail above, the aerosol ink 18 includes a plurality of chromium-containing metallic microparticles 24 within a solvent system 26 and any soluble additives therein. The aerosol ink 18 may be supplied to the spray head 13 (including at least one nozzle 12) from the storage container 28 via the supply line 30.

A gas supply 32 is shown having multiple gas lines (first gas line 34 and second gas line 36) to provide gas flows to the nozzle 12. In one embodiment, the first gas line 34 provides a first gas flow to the nozzle 12, which serves as an atomizer flow for mass transfer of the aerosol ink during printing. The second gas line 36 may provide a second gas flow to the nozzle 12, which serves as a focusing mass flow (e.g., a sheath gas flow) to concentrate the aerosol ink exiting the nozzle 12. In one embodiment, the component 16 may be positioned on a heating element 17 so as to control the temperature of the component 16 during printing. Through control of the gas flows and the temperature of the component, the drying time of the ink applied may be controlled as desired.

As stated, the operation of the nozzle 12, the flow of the gasses (e.g., the first gas flow and the second gas flow), and/or the temperature of the component 16 (e.g., via the heating element 17) may be controlled by a processing device or controller 22 that may be operatively coupled to a control panel (not shown) for user manipulation to regulate operation of the direct write process. In response to user manipulation of the control panel or a computer program, controller 22 operates the various components of direct write system 10 to execute printing processes. As described in more detail below with respect to FIG. 3, controller 22 may include a memory and microprocessor, such as a general or special purpose microprocessor operable to execute programming instructions or micro-control code associated with methods described herein. Alternatively, controller 22 may be constructed without using a microprocessor, e.g., using a combination of discrete analog and/or digital logic circuitry (such as switches, amplifiers, integrators, comparators, flip-flops, AND gates, and the like) to perform control functionality instead of relying upon software. The control panel and other components of direct write system 10 may be in communication with controller 22 via one or more signal lines or shared communication busses.

Figure 3:
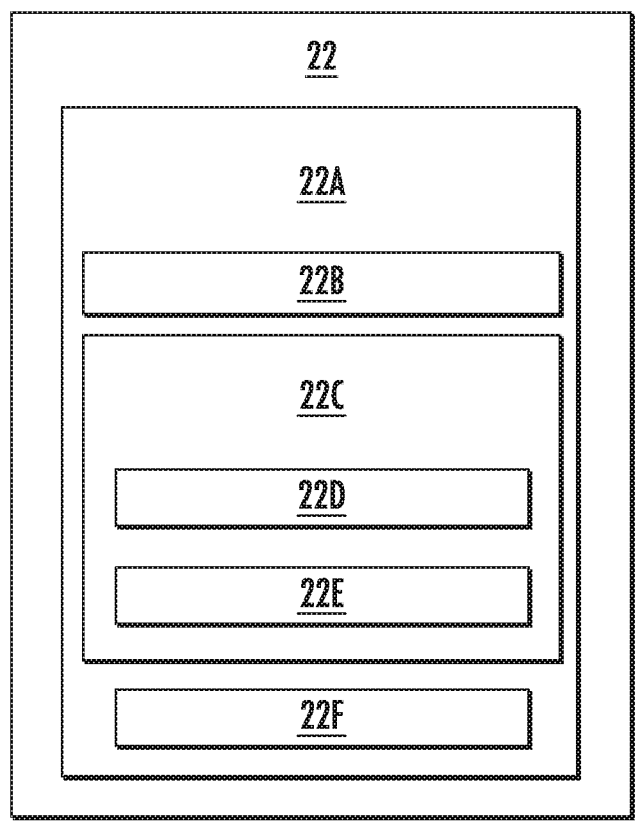
FIG. 3 shows a diagram of an exemplary controller for use with a direct write system, such as in FIGS. 1 and 2.

FIG. 3 depicts steps performed in a particular order for purposes of illustration and discussion. Those of ordinary skill in the art, using the disclosures provided herein, will understand that the steps of any of the methods discussed herein can be adapted, rearranged, expanded, omitted, or modified in various ways without deviating from the scope of the present disclosure. Moreover, although aspects of method 100 are explained using direct write system 10 as an example, it should be appreciated that these methods may be applied to manufacturing process using any suitable direct write machine, and other non-contact printing methods/systems.

FIG. 3 depicts certain components of controller 22 according to example embodiments of the present disclosure. Controller 22 can include one or more computing device(s) 22A which may be used to implement methods as described herein. Computing device(s) 22A can include one or more processor(s) 22B and one or more memory device(s) 22C. The one or more processor(s) 22B can include any suitable processing device, such as a microprocessor, microcontroller, integrated circuit, an application specific integrated circuit (ASIC), a digital signal processor (DSP), a field-programmable gate array (FPGA), logic device, one or more central processing units (CPUs), graphics processing units (GPUs) (e.g., dedicated to efficiently rendering images), processing units performing other specialized calculations, etc. The memory device(s) 22C can include one or more non-transitory computer-readable storage medium(s), such as RAM, ROM, EEPROM, EPROM, flash memory devices, magnetic disks, etc., and/or combinations thereof.

The memory device(s) 22C can include one or more computer-readable media and can store information accessible by the one or more processor(s) 22B, including instructions 22D that can be executed by the one or more processor(s) 22B. For instance, the memory device(s) 22C can store instructions 22D for running one or more software applications, displaying a user interface, receiving user input, processing user input, etc. In some implementations, the instructions 22D can be executed by the one or more processor(s) 22B to cause the one or more processor(s) 22B to perform operations, e.g., such as one or more portions of methods described herein. The instructions 22D can be software written in any suitable programming language or can be implemented in hardware. Additionally, and/or alternatively, the instructions 22D can be executed in logically and/or virtually separate threads on processor(s) 22B.

The one or more memory device(s) 22C can also store data 22E that can be retrieved, manipulated, created, or stored by the one or more processor(s) 22B. The data 22E can include, for instance, data to facilitate performance of methods described herein. The data 22E can be stored in one or more database(s). The one or more database(s) can be connected to controller 22 by a high bandwidth LAN or WAN, or can also be connected to controller through network(s) (not shown). The one or more database(s) can be split up so that they are located in multiple locales. In some implementations, the data 22E can be received from another device.

The computing device(s) 22A can also include a communication module or interface 22F used to communicate with one or more other component(s) of controller 22 or direct write system 10 over the network(s). The communication interface 22F can include any suitable components for interfacing with one or more network(s), including for example, transmitters, receivers, ports, controllers, antennas, or other suitable components.

Figure 4:
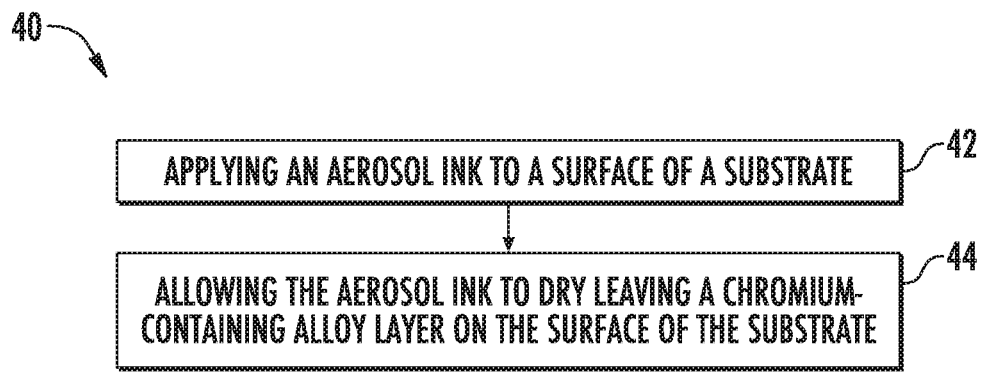
FIG. 4 shows an exemplary method of a direct write process using an aerosol ink.

As stated above, methods are also provided for forming a core-shell nanoparticle, including non-contact printing methods (e.g., direct write printing). FIG. 4 shows an exemplary method 40 that includes applying an aerosol ink, such as described above, to the surface of the substrate at 42 and allowing the aerosol ink to dry leaving the chromium-containing alloy layer on the surface of the substrate at 44.

Figure 5:
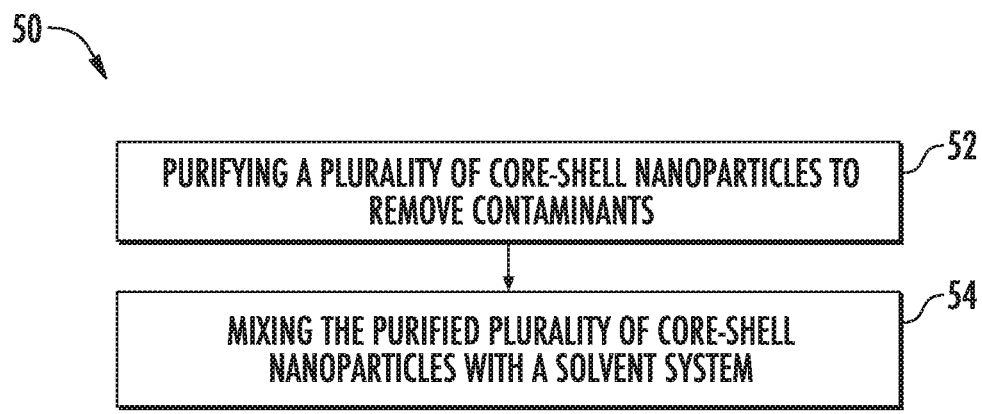
FIG. 5 shows an exemplary method of forming an aerosol ink that includes a plurality of core-shell nanoparticles within a solvent system.

Also as stated above, methods are also provided for forming an aerosol ink, such as for use within non-contact printing methods (e.g., direct write printing). FIG. 5 shows an exemplary method 50 that includes purifying a plurality of core-shell nanoparticles to remove contaminants at 52 and mixing the purified plurality of core-shell nanoparticles with a solvent system at 54. In one embodiment, the plurality of core-shell nanoparticles have a maximum dimension of 100 nm and include a chromium-containing core surrounded by a shell that has a chromium content that is less than that of the core.

Figure 7:
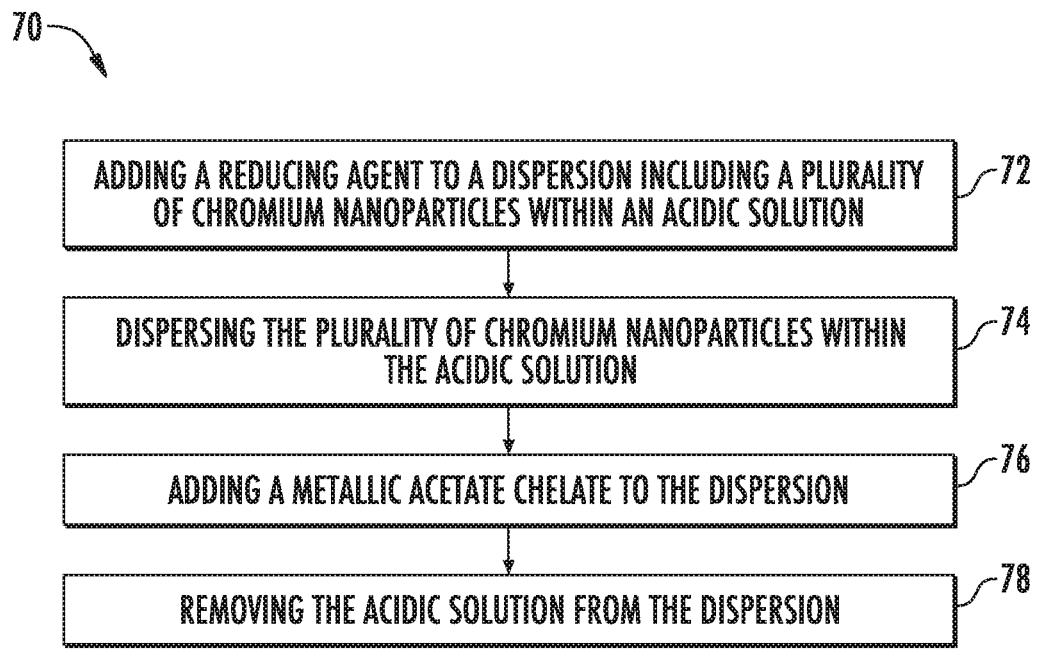
FIG. 7 shows an exemplary method of forming a core-shell nanoparticle according to certain embodiments herein.

FIG. 7 shows an exemplary method 70 of forming a plurality of core-shell nanoparticles from a dispersion containing a plurality of chromium nanoparticles in an acidic solution. The method 70 includes adding a reducing agent to the dispersion including the plurality of chromium nanoparticles at 72. The chromium nanoparticles have a first chromium content. The method 70 includes dispersing the plurality of chromium nanoparticles within the acidic solution at 74. The method 70 also includes adding a metallic acetate chelate to the dispersion at 76. The metallic acetate chelate may include a metallic material that surrounds the chromium nanoparticles to form the plurality of core-shell nanoparticles, as described above. For instance, the metallic material has a second chromium content that is less than the first chromium content. At 78, the acidic solution may be removed from the dispersion.

This written description uses exemplary embodiments to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. An aerosol ink, comprising:
a plurality of core-shell microparticles or nanoparticles dispersed in a solvent system, the core-shell microparticles or nanoparticles present in a loading amount of 5% to 30% by weight of the aerosol ink, the core-shell microparticles or nanoparticles including:
a core comprising a first metallic material having a first chromium content; and
a shell surrounding the core and comprising a second metallic material having a second chromium content that is less than the first chromium content, the shell to facilitate sintering of the microparticles or nanoparticles by decreasing a surface energy barrier,
wherein the aerosol ink includes between 0.1% and 1% by weight of a radical scavenger.

2. The aerosol ink of claim 1, wherein the first chromium content is 5% by weight or greater of elemental chromium within the first metallic material.

3. The aerosol ink of claim 1, wherein the second metallic material is substantially free from chromium.

4. The aerosol ink of claim 1, wherein the second metallic material comprises palladium, copper, nickel, platinum, gold, silver, iron, titanium, or a mixture thereof.

5. The aerosol ink of claim 1, wherein the second metallic material comprises 50% by weight or greater of palladium.

6. The aerosol ink of claim 1, wherein the first metallic material comprises 50% by weight or greater of elemental chromium.

7. The aerosol ink of claim 1, wherein the first metallic material consists essentially of elemental chromium.

8. The aerosol ink of claim 1, wherein the core-shell microparticles are a maximum dimension of 250 nm or less.

9. The aerosol ink of claim 8, wherein the core has a maximum diameter of 50 nm or less, and wherein the shell has an average thickness surrounding the core of 25 nm to 75 nm.

10. The aerosol ink of claim 1, wherein the solvent system comprises a mixture of a first solvent and a second solvent, and wherein the second solvent has a vapor pressure that is lower than the first solvent.

11. The aerosol ink of claim 1, wherein the aerosol ink has an Ohnesorge's number of 0.04 to 0.4.

12. The aerosol ink of claim 1, wherein the solvent system comprises 1-methoxy-2-propanol, α-terpineol, cyclohexane, or a mixture thereof.

13. A method of forming a plurality of core-shell microparticles or nanoparticles from a dispersion containing a plurality of chromium microparticles or nanoparticles in an acidic solution, the method comprising:
adding a reducing agent to the dispersion including the plurality of chromium nanoparticles, wherein the chromium microparticles or nanoparticles have a first chromium content;
dispersing the plurality of chromium microparticles or nanoparticles within the acidic solution;
adding a metallic acetate chelate to the dispersion, wherein the metallic acetate chelate comprises a metallic material that surrounds the chromium microparticles or nanoparticles to form the plurality of core-shell microparticles or nanoparticles, and wherein the metallic material has a second chromium content that is less than the first chromium content, a shell of the core-shell microparticles or nanoparticles to facilitate sintering of the microparticles or nanoparticles by decreasing a surface energy barrier; and
removing the acidic solution from the dispersion, the dispersion forming an aerosol ink, wherein the aerosol ink includes between 0.1% and 1% by weight of a radical scavenger, the core-shell microparticles or nanoparticles present in a loading amount of 5% to 30% by weight of the aerosol ink.

14. The method of claim 13, further comprising:
prior to adding the metallic acetate chelate to the dispersion, mixing a metallic acetate with a chelating agent to form the metallic acetate chelate, wherein the metallic acetate comprises the metallic material.

15. The method of claim 13, wherein the metallic material is substantially free from chromium.

16. The method of claim 13, wherein the metallic material comprises palladium, copper, nickel, platinum, gold, silver, iron, titanium, or a mixture thereof.

17. The method of claim 13, further comprising:
prior to exposing the plurality of chromium microparticles or nanoparticles to the reducing agent, ultrasonically dispersing the plurality of chromium microparticles or nanoparticles within the acidic solution.

18. The method of claim 13, further comprising:
prior to adding the metallic acetate chelate to the dispersion, adding a capping solution to the dispersion.

19. The method of claim 13, wherein the first chromium content is 5% by weight or greater elemental chromium.

* * * * *